[12] United States Patent
Niessner et al.

(10) Patent No.: US 8,505,964 B2
(45) Date of Patent: Aug. 13, 2013

(54) AIRBAG COVER FOR AN AIRBAG IN A MOTOR VEHICLE

(75) Inventors: Harry Niessner, Boeblingen (DE); Friedrich Reiter, Sindelfingen (DE); Andreas Sigloch, Sindelfingen (DE); Berthold Fehr, Essen (DE); Stephan Meyer, Sprockhoevel (DE); Martin Lippert, Meerbusch (DE); Franz Willi Roesnick, Hilden (DE)

(73) Assignee: Johnson Controls Interiors GmbH & Co. KG, Grefrath (DE)

( * ) Notice: Subject to any disclaimer, the term of this patent is extended or adjusted under 35 U.S.C. 154(b) by 1453 days.

(21) Appl. No.: 10/589,245

(22) PCT Filed: Feb. 2, 2005

(86) PCT No.: PCT/EP2005/001010
§ 371 (c)(1),
(2), (4) Date: Apr. 22, 2011

(87) PCT Pub. No.: WO2005/090131
PCT Pub. Date: Sep. 29, 2005

(65) Prior Publication Data
US 2011/0316261 A1 Dec. 29, 2011

(30) Foreign Application Priority Data
Feb. 20, 2004 (DE) .......................... 10 2004 009 914

(51) Int. Cl.
*B60R 21/215* (2006.01)
(52) U.S. Cl.
USPC ...................................................... 280/728.3

(58) Field of Classification Search
USPC ........................................................ 280/728.3
See application file for complete search history.

(56) References Cited

U.S. PATENT DOCUMENTS

| | | | |
|---|---|---|---|
| 3,794,349 A | | 2/1974 | Fuller |
| 5,183,289 A * | | 2/1993 | Zeller et al. ................. 280/728.3 |
| 5,362,096 A * | | 11/1994 | Satoh et al. ................. 280/728.3 |
| 5,393,089 A * | | 2/1995 | Pakulsky et al. ........... 280/728.3 |
| 5,427,408 A * | | 6/1995 | Ando et al. ................. 280/728.3 |
| 5,433,474 A * | | 7/1995 | Farrington et al. ........ 280/728.3 |
| 5,437,470 A * | | 8/1995 | Terai et al. ................. 280/728.3 |
| 5,452,913 A * | | 9/1995 | Hansen et al. .............. 280/728.1 |
| 5,498,027 A * | | 3/1996 | Kelley et al. ............... 280/728.3 |
| 5,573,267 A * | | 11/1996 | Yamakawa et al. ........ 280/728.3 |
| 5,580,081 A * | | 12/1996 | Berg et al. .................. 280/728.3 |
| 5,639,115 A * | | 6/1997 | Kelley et al. ............... 280/728.3 |

(Continued)

FOREIGN PATENT DOCUMENTS

| | | |
|---|---|---|
| DE | 4214662 A1 * | 11/1993 |
| DE | 195 46 001 | 6/1997 |

(Continued)

*Primary Examiner* — Nicole Verley
(74) *Attorney, Agent, or Firm* — Paul Vincent

(57) ABSTRACT

Disclosed is an airbag cover (10) for an airbag (1), comprising a flap (2) which is opened when the airbag (1) is triggered. The flap (2) is coupled to a trim part (6) of the trim panel (3) of the passenger compartment by means of a connecting element (5). The connecting element (5) comprises at least one hinge (7) having several hinge axes (X, Y) and which is suitable for diverting part of the actuating forces of the airbag (1) acting in the direction of opening (B) towards a force component (FQ) perpendicular to the direction of opening (B).

18 Claims, 2 Drawing Sheets

(56) References Cited

U.S. PATENT DOCUMENTS

| | | | |
|---|---|---|---|
| 5,641,177 A * | 6/1997 | Berg et al. | 280/728.3 |
| 5,775,727 A * | 7/1998 | Sun et al. | 280/728.3 |
| 5,901,976 A * | 5/1999 | Kreuzer et al. | 280/728.3 |
| 5,941,557 A * | 8/1999 | Mullins et al. | 280/728.3 |
| 6,131,945 A * | 10/2000 | Labrie et al. | 280/728.3 |
| 6,170,859 B1 * | 1/2001 | Kausch | 280/728.3 |
| 6,286,859 B2 * | 9/2001 | Derrick et al. | 280/728.2 |
| 6,299,198 B1 * | 10/2001 | Nakashima et al. | 280/728.3 |
| 6,315,321 B1 * | 11/2001 | Lutz | 280/728.3 |
| 6,357,787 B2 * | 3/2002 | Lorenz et al. | 280/728.3 |
| 6,364,345 B1 | 4/2002 | Lang | |
| 6,443,483 B2 * | 9/2002 | Ellerbrok | 280/728.3 |
| 6,523,854 B1 * | 2/2003 | Muller | 280/728.3 |
| 6,568,705 B2 * | 5/2003 | Kinane | 280/728.3 |
| 6,644,685 B2 * | 11/2003 | Sun et al. | 280/728.3 |
| 6,719,320 B2 * | 4/2004 | Gray et al. | 280/728.3 |
| 6,761,375 B2 * | 7/2004 | Kurachi et al. | 280/732 |
| 6,846,006 B2 * | 1/2005 | Okuda et al. | 280/728.3 |
| 7,029,027 B2 * | 4/2006 | Gray et al. | 280/728.3 |
| 7,080,852 B2 * | 7/2006 | Hayashi | 280/728.3 |
| 7,222,876 B2 * | 5/2007 | Riesinger et al. | 280/728.3 |
| 7,234,726 B2 * | 6/2007 | Trevino et al. | 280/728.3 |
| 7,367,587 B2 * | 5/2008 | Taoka | 280/751 |
| 7,384,060 B2 * | 6/2008 | Bisognin et al. | 280/728.3 |
| 7,487,994 B2 * | 2/2009 | Okada et al. | 280/732 |
| 7,500,693 B2 * | 3/2009 | Guth et al. | 280/728.3 |
| 7,661,698 B2 * | 2/2010 | Yamada et al. | 280/728.3 |
| 7,959,183 B2 * | 6/2011 | Perez Garcia | 280/728.3 |
| 8,181,986 B2 * | 5/2012 | Schlemmer | 280/728.3 |
| 8,191,924 B2 * | 6/2012 | Schupbach | 280/728.3 |
| 2002/0003343 A1 * | 1/2002 | Kansteiner | 280/728.3 |
| 2003/0085555 A1 * | 5/2003 | Segura | 280/728.3 |
| 2003/0178818 A1 | 9/2003 | Schneider | |
| 2004/0124613 A1 * | 7/2004 | Cowelchuk | 280/728.2 |
| 2004/0164524 A1 * | 8/2004 | Ono et al. | 280/728.3 |
| 2005/0116453 A1 * | 6/2005 | Geum | 280/732 |
| 2005/0140121 A1 * | 6/2005 | Hayashi et al. | 280/728.3 |
| 2005/0269804 A1 * | 12/2005 | Yamada et al. | 280/728.3 |
| 2006/0202448 A1 * | 9/2006 | Sawada et al. | 280/728.3 |
| 2007/0080521 A1 * | 4/2007 | Leserre et al. | 280/728.3 |
| 2007/0102903 A1 * | 5/2007 | Kong | 280/728.3 |
| 2007/0145728 A1 * | 6/2007 | Sadano et al. | 280/732 |

FOREIGN PATENT DOCUMENTS

| | | |
|---|---|---|
| DE | 197 01 502 | 7/1998 |
| DE | 298 06 083 | 9/1998 |
| DE | 199 60 251 | 6/2001 |
| EP | 1 112 89 | 7/2001 |
| EP | 1 112 899 | 7/2001 |
| EP | 1 238 872 | 9/2002 |
| JP | 2003182497 | 7/2003 |
| JP | 2005075141 | 3/2005 |
| WO | WO 01/42060 | 6/2001 |
| WO | WO 03/082632 | 10/2003 |
| WO | WO 2004/009410 | 1/2004 |

\* cited by examiner

AIRBAG COVER FOR AN AIRBAG IN A MOTOR VEHICLE

This application is the national stage of PCT/EP2005/001010 filed on Feb. 2, 2005 and also claims Paris Convention priority of DE 10 2004 009 914.6 filed on Feb. 20, 2004.

BACKGROUND OF THE INVENTION

The invention concerns an airbag cover for an airbag of a motor vehicle in accordance with the features of the precharacterizing part of claim 1.

Airbag covers of this type cover a space for receiving the airbag module which is inflated instantly in case of collision of the vehicle, thereby tearing away, i.e. opening, the airbag cover. In the closed state, the flap-like airbag covers are retained on the bordering panelling parts of the vehicle via predetermined tearing regions, such that the interior panelling has a substantially continuous surface. In order to prevent the passengers from being injured when the airbag is triggered, the airbag covers are mounted on one side to the interior panelling via connecting means. An airbag cover therefore opens e.g. in an upward direction towards the windshield of the vehicle when the predetermined tearing regions have torn. In a passenger protection device of gas-operated airbags, the covers of airbags must open quickly to prevent injuries by thrown covering parts. Since the flap-like cover is opened by the instantly blown-up airbag itself, large forces may be generated when the airbag cover is torn open. The windshield or other components inside the passenger compartment could thereby be damaged.

German publication DE 197 35 438 A1 discloses such an airbag cover for a passenger retaining system (airbag), wherein a reinforcement plate of the flap is mounted to the interior panelling of the vehicle using a sheet metal-like connecting element. The sheet metal strip has a deformation part which initiates a linear motion of the flap when it is abruptly opened, i.e. lifting the flap uniformly in the opening direction and then completely pivoting it open after deformation of the deformation part. The deformation part of the sheet metal strip slightly dampens the opening motion of the flap, but there is still the danger that the forces required for tearing off the flap produce an uncontrolled pivoting motion due to excessive acceleration. This could damage the windshield or bordering panelling parts of the interior panelling.

German patent DE 42 14 662 C2 describes an impact protection means for passengers comprising a cover which is mounted to the interior panelling via an articulated element that can be deformed. This deformable articulated element has a predetermined bending point and a cavity region, such that the opening motion about a pivot axis is effected without being impaired by bordering panelling parts. When the airbag flap is torn open and subsequently pivoted away, the windshield may still be damaged, since the increased tearing forces are converted directly via the pivot axis into an overproportional acceleration of the flap.

In contrast thereto, it is the underlying purpose of the present invention to provide an airbag cover for an airbag of a vehicle, which opens faster than conventional ones and reduces the danger of injuries and damage caused by opening the pivotable airbag flap.

SUMMARY OF THE INVENTION

This object is achieved with an airbag cover having the features of the independent claim. Advantageous embodiments and further developments of the invention are the subject matter of the dependent claims.

The airbag cover in accordance with the invention comprises a flap which is opened upon triggering of the airbag, thereby being retained on a panelling part of the interior panelling of the vehicle in an articulated manner via a connecting element, wherein the connecting element is at least one hinge having at least two hinge axes X, Y. The flap hinge having two hinge axes is designed and mounted such that, at the start of the opening phase of the air bag, part of the operating forces acting in the opening direction B are deflected into a force component transverse to the opening direction B. The transverse force component improves and accelerates tearing of the flap in a direction away from the predetermined tearing regions opposite to the hinge. Due to the double-articulated hinge, the flap of the airbag cover is thereby not just pushed open about one single deflection axis during opening, but a force component transverse to the opening direction is initially generated to support tearing open of the predetermined tearing regions provided between the flap and the bordering panelling parts. The inventive airbag cover thereby opens more quickly than those of conventional systems. This also further reduces overproportional acceleration of the flap and the danger of damaging parts or injuring passengers. The lever arms of the hinge having at least two hinge axes convert part of the operating forces during tearing open of the airbag flap into transverse forces which are used for tearing open, such that the resulting projecting force during pivoting open of the flap is reduced by this amount. The two hinge axes of the articulated flap hinge also prevent bordering panelling parts from being damaged and ensure that the flap does not hit bordering parts and does not completely open during pivoting. The inventive double-axis hinge connection ensures complete and free pivoting open of the flap without being blocked by bordering regions even for thicker panelling. A hinge as defined in this connection is any connecting means which permits a pivoting motion of a hinged part about at least two pivot axes. The inventive hinge may be designed as a rigid, double-articulated hinge and also as a flexible, strip-like flap hinge. The at least two hinge axes may be realized by any conventional means and may be formed e.g. as predetermined bending points in a sheet metal strip which connects the flap to the bordering panelling part. Other hinge types comprising pivot bearings may also be used.

In accordance with an advantageous embodiment of the invention, the hinge is formed from a material which has good tensile strength. In order to deflect part of the opening forces generated by the airbag itself during tearing away of the airbag flap, only the flap must be initially pulled in a direction transverse to the opening direction via the double-articulated axis in order to facilitate tearing of the predetermined tearing regions on the region of the flap opposite to the hinge. Towards this end, the inventive hinge having at least two hinge axes must be non-flexible in the longitudinal direction. This is achieved by using a hinge or hinge region material which has proper tensile strength. In accordance with the invention, the use of a resilient, flexible material for the hinge automatically produces two hinge axes at the connecting points to the bordering rigid panelling part and the flap. When the airbag is triggered, the flap is initially lifted and thereby pulled away from the predetermined tearing points by the double-articulated hinge until they are completely detached. The inventive airbag flap is subsequently further pivoted about the second hinge axis, wherein the acceleration of the flap is reduced since part of the opening forces were used to tear off the flap. The inventive airbag cover therefore opens faster and with better control than conventional airbag flaps.

In accordance with a further advantageous embodiment of the invention, both the panelling part and the flap have a reinforcement plate which is directly connected to the hinge. The hinge may thereby be designed as a bridge-like sheet metal part between the reinforcement plates. The direct connection to the reinforcement plates, which is generally surrounded by cast plastic foam and/or panelling sheets, produces safe retention and safe mounting of the flap upon instantaneous triggering of the airbag. The inventive hinge having two hinge axes may also be produced separately and from a different material, and be mounted to the connecting sheet metals via any conventional connecting means such as e.g. rivets, screws, welding or the like.

In accordance with a further advantageous embodiment of the invention, the inventive hinge with two hinge axes is formed in one piece with the reinforcement plates, and the hinge axes X, Y are formed as predetermined bending points in the sheet metal-like material. For this reason, the production of the airbag cover is very easy, requiring no additional assembly or mounting steps for mounting the flap to the panelling part. The predetermined bending points formed by the hinge axes X, Y may e.g. be formed by material cut-outs and tapering regions in the edge region of the reinforcement plate of the panelling part and that of the flap. The predetermined bending points can also be produced using longitudinal, groove-like depressions in the sheet metal material.

In accordance with a further advantageous embodiment of the invention, the hinge is formed as a retaining strap hinge of metal or plastic material. The inventive deflection of part of the opening forces of the airbag into transverse forces which support tearing open merely requires provision of two articulated axles on the hinge. Even when the hinge is flexible, the connecting points between a retaining strap hinge and the rigid panelling part and the flap form parallel double hinge axes of this type. When the airbag has been triggered, it keeps the flap in the open position, and for this reason the hinges of the flap need not be rigid. The retaining strap design of the hinge of metal or plastic material is inexpensive to produce, requiring no laser cutting, punching or bending operations in contrast to a sheet metal strip hinge. In accordance with one related aspect, the hinge is produced from a metallic weave, a plastic weave or a metal plastic mixture. The hinges are therefore flexible and facilitate adjustment and mounting of the airbag cover.

In accordance with a further advantageous embodiment of the invention, the separation between the at least two hinge axes X, Y is adjusted to the thickness of the bordering panelling part of the interior panelling of the vehicle. While at the start of airbag triggering, the flap is pivoted about the hinge axis X on the side of the panelling part, thereby lifted and laterally pulled away. It is subsequently pivoted about the hinge axis Y on the side of the airbag flap, without the reinforcing and carrier material of the panelling part blocking the pivoting motion. Opening via the inventive hinge with two hinge axes thereby effects a doubling over at the hinge without damaging the bordering panelling part of the interior panelling of the vehicle. This obviates difficult and expensive repair after triggering of the airbag.

In accordance with a further advantageous embodiment of the invention, the width of the hinge is adjusted to generate predetermined transverse forces $F_Q$ within the temperature range of airbag use. The width of the hinge, which may e.g. be realized in the form of a sheet metal strip, is thereby selected such that the transverse forces which are generated through airbag triggering are controlled within a temperature range of use of the airbag by increasing or reducing the resistance at the hinge axes. The smaller the width of the hinge, the larger the transverse force components in the initial phase of airbag triggering. This permits optimum adjustment of the hinge to the respective situation and also e.g. adjustment in dependence on the retaining forces of the predetermined tearing areas or predetermined breaking points.

In accordance with a further advantageous embodiment of the invention, at least one opening is provided in the hinge material for controlling the transverse forces that act on the flap in the opening phase of the airbag. The forces acting on the hinge during opening can be controlled by the openings or the at least one opening in the hinge or hinge region, since this permits adjustment of the pivoting properties and the amount of energy absorbed in the inventive, double-axis hinge. An opening in the hinge improves deformation compared to the same hinge without opening. This deformation increases or decreases the amount of energy absorbed within the hinge when the flap is torn open and lifted.

In accordance with a further advantageous embodiment of the invention, the airbag cover has a carrier layer having at least one free space in the region of the hinge. The free space controls the power of the transverse forces acting upon airbag triggering, since the facility of actuation of the hinge can be adjusted through defined predetermined free spaces. In accordance with a related advantageous aspect of the invention, the free space in the carrier layer in the region of the hinge on the side of the panelling part is different than on the side of the flap, to control the strength of the transverse forces when the airbag is triggered. The free space may e.g. be larger and deeper on the side of the panelling part than on the side of the flap. This supports generation of transverse forces in the initial phase and thereby tearing open of the airbag flap, still dampening the continuing opening pivoting motion of the flap, such that overproportional acceleration and hurling of the flap is prevented as is any damage to the windshield or the like.

In accordance with a further advantageous embodiment of the invention, the hinge is mounted to the panelling part and to the flap at opposite sides of the carrier layer. The hinge thereby produces a kind of material step, which also permits control of the forces and, in particular, of the direction of the transverse forces generated when the airbag is triggered, to ensure optimum tearing open and fast triggering of the airbag.

Further advantages and features of the invention can be extracted from the following detailed description which describes the invention in more detail with reference to the embodiments shown in the enclosed drawing.

DESCRIPTION OF THE PREFERRED EMBODIMENT

Figure 1:
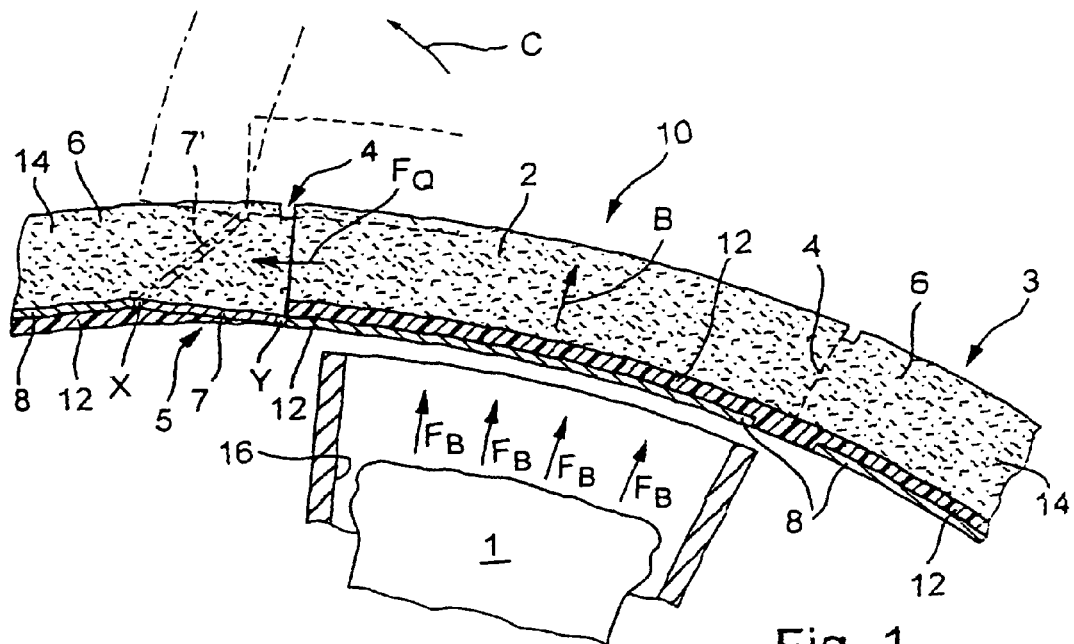
FIG. 1 shows a schematic side view of an embodiment of an inventive airbag cover in the closed state and its motion sequence after triggering of the airbag.

FIG. 1 shows a schematic side view of the principle of operation of the inventive airbag cover, with reference to a first embodiment. The airbag cover 10 is provided to cover and seal an airbag 1 which is located behind an interior panelling 3 inside a vehicle. The airbag 1 is in the rest position, i.e. before triggering in case of a collision, inside an airbag receiving space 16 which is closed by an airbag flap 2 which is substantially flush with the panelling parts 6 of the interior panelling 3. When the airbag 1 is triggered, the flap 2 is torn away via specially provided predetermined tearing regions 4 or breaking points, and allows complete inflation of the airbag inside the passenger compartment (direction of arrow B). The flap 2 is removed by the airbag itself when the airbag 1 is triggered, i.e. by the gas sack, which is pressed out of the airbag receiving space 16 and is instantly inflated. To prevent the passengers in the passenger compartment from being injured by the torn-away airbag flap 2, these flaps 2 are retained on one side on the bordering panelling part 6 via connecting elements 5. The flap performs a pivoting opening motion C, preferably in an upward direction within the passenger compartment towards the windshield (not shown). Towards this end, the inventive airbag cover 10 has a specific connecting element 5 in the form of a hinge 7 which can be pivoted about two parallel axes X, Y.

The hinge 7 of this embodiment is mounted between the reinforcement plates 8 of a panelling part 6 and the flap 2, forming two hinge axes X, Y about which the flap 2 can be pivoted during opening. The inventive hinge 7 having two hinge axes X, Y may also be mounted to other parts than the reinforcement plate 8 as long as safe retention between the flap 2 and the bordering panelling part 6 is ensured. The hinge 7 of this embodiment is articulated in the lower region to the panelling part 6 and the flap 2. The panelling part 6 (on the left in FIG. 1) is articulated to the reinforcement plate 8 above a carrier layer 12 via the hinge axis X. The airbag flap 2 in this embodiment is hinged, via the hinge axis Y, to the reinforcement plate 8 of the flap 2, which is provided below a carrier layer 12. The material step or change between the regions above and below the carrier layer 12 permits specific adjustment of the opening and pivoting motion in accordance with the inventive airbag cover 10 as further described below. When the airbag 1 has been triggered, the flap 2 is initially lifted in the opening direction B in the initial phase, wherein in accordance with the invention, the double-articulated hinge 7 immediately generates a transverse force $F_Q$ at right angles to the actual actuating force $F_B$. Since the predetermined tearing point 4 has not become completely detached from the hinge 7 in this state, the transverse force $F_Q$ generated thereby facilitates and accelerates the tearing process when the airbag 1 is opened. The transverse force $F_Q$ pulls the flap 2 away from the predetermined tearing point 4 in this state. In conventional airbag covers of this type, only one opening motion in a linear outward direction (transverse to the longitudinal direction of the airbag cover) is generated for tearing off the predetermined tearing regions 4 which results in excessive forces and overproportional acceleration during subsequent pivoting open of the flap 2, easily causing damage to the windshield or bordering parts. This is prevented in accordance with the invention by the hinge 7 with two hinge axes X, Y, since part of the operating force $F_B$ is converted into a transverse force component $F_Q$, which is also reduced by the resulting tearing process. The resulting pivot force in the pivot direction C is thereby correspondingly reduced or dampened. The inventive flap 2 of the airbag cover 10 can moreover be completely pivoted open, thereby releasing the airbag 1 without being obstructed, since the flap 2 does not hit the bordering panelling part 6 even when the panelling parts are relatively thick, being provided with foam 14 above the carrier layer 12. The hinge 7 may thereby have any desired shape as long as it has at least two hinge axes X, Y and is adjusted to pull the flap 2, which opens due to the airbag pressure, away from the predetermined tearing region 4 into a transverse direction in the initial opening phase. The hinge 7 may e.g. be formed as a sheet metal strip between a reinforcement plate 8 of the flap 2 and the panelling part 6. Other shapes are also feasible, e.g. flexible, retaining strap hinges or hinges from a metal weave, plastic weave or a mixture of both. Plastic weaves are inexpensive to produce and can be used within larger tolerances. The inventive airbag cover accelerates opening of the airbag with very simple constructive means, which may be in the region of only 5 ms. Moreover, overproportional acceleration during opening in direction C is prevented by partial absorption of energy by generating a transverse force component $F_Q$ used for tearing open, which prevents damage to bordering components in the vehicle and reduces the risk of injuring passengers and the driver. FIG. 1 shows different positions of the pivoting motion C of the flap 2 with dashed and dash-dotted lines. The hinge 7 initially effects inclined erection of the flap 2 on the side of the hinge 7, since the tearing regions 4 are still connected. This generates an immediate transverse force in the initial phase. The dynamics of the actual pivoting motion of the flap 2 is reduced only after complete detachment.

Figure 2:
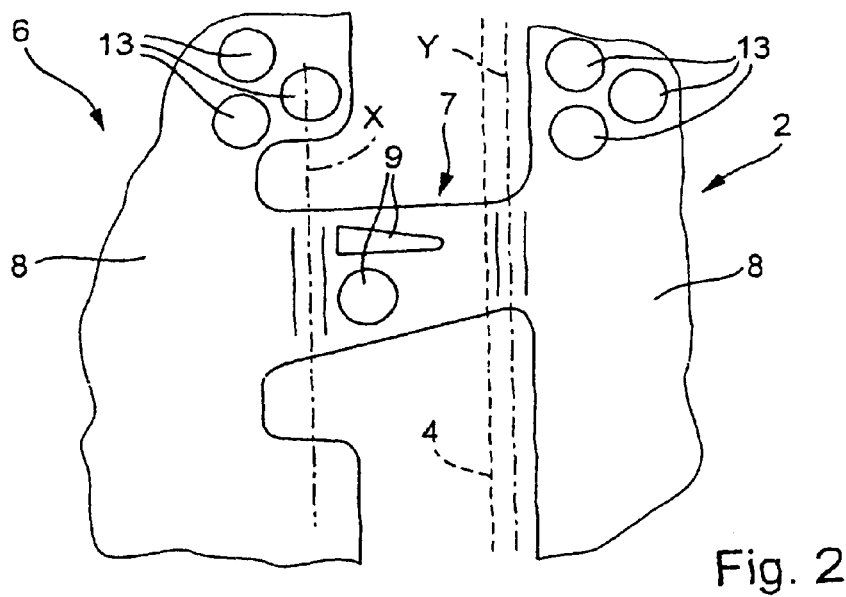
FIG. 2 shows a sectional top view of an embodiment of an inventive reinforcement plate with integral strip-like hinge.

FIG. 2 shows a sectional top view of a further embodiment of the inventive airbag cover with a hinge 7 formed as sheet metal strip between the flap 2 and the panelling part 6. As in the above embodiment, the number of hinges 7 provided on the airbag cover can vary depending on the requirements, e.g. two or more inventive connecting elements may be provided with a double-articulated hinge 7. In the example of FIG. 2, the hinge 7 is formed in one piece with the reinforcement plates 8 of the flap 2 and the panelling part 6 to which the flap 2 is connected. The hinge or the hinge region 7 is provided in the form of a bridge-like connection between the respective reinforcement plates 8, wherein two hinge axes X, Y each are formed on the panelling part 6 and the airbag flap 2. The hinge axes X, Y may be realized e.g. in the form of predetermined bending points through material reductions or through specific free spaces of a rigid carrier layer (not shown in FIG. 2) which is connected to the reinforcement plate 8. In this embodiment, two openings 9 are provided in the center of the hinge 7, which permit adjustment of the pivoting properties and pivoting forces of the flap 2 when the airbag is triggered. The openings 9 absorb more energy in this region due to directed deformation of the hinge 7, such that the resulting pivot force in the pivot direction C is correspondingly reduced. In this fashion, the pivoting motion can be dampened by the inventive hinge, at the same time facilitating tearing off the airbag cover. The size and shape of the openings 9 can thereby be indirectly used to adjust the transverse forces $F_Q$ generated during opening.

In an alternative fashion, the hinge 7 width may be adjusted to vary the resistance and thereby the accepted energy as well as the forces acting during opening. Integration of the hinge 7 in the bordering carrier layers or foam layers may also be varied by e.g. providing the free spaces of the carrier layer in the region of the hinge (see FIG. 1). It is essential to the invention that the opening forces $F_B$ generated by the airbag 1 are at least partially diverted into a transverse force component $F_Q$ by the hinge 7. For this reason, the hinge must be more resistant, at least to tension. FIG. 2 moreover shows three openings 13 in the upper region of each reinforcement plate 8 for connection to the bordering layers such as e.g. a carrier layer 12, a foam layer 14 etc. The inventive sheet metal part 7, 8 with intermediate band-like hinge with double-articulated axes X, Y can be produced in any conventional manner, e.g. through laser cutting or punching. The same applies for the predetermined tearing regions 4 of the airbag cover 10.

Figure 3A:
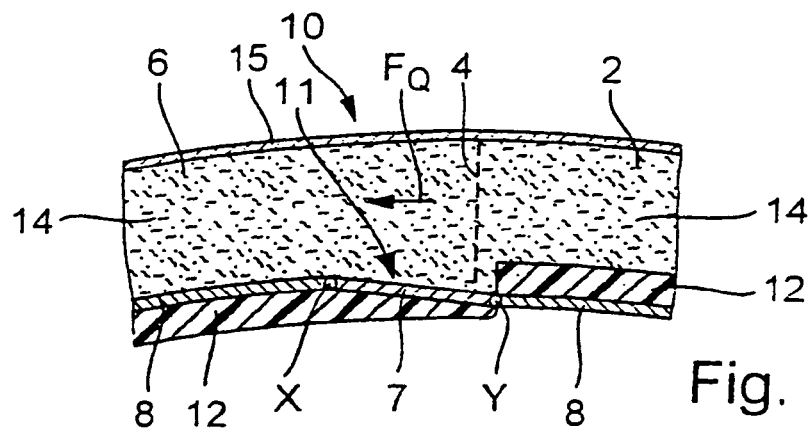
FIGS. 3a, 3b, 3c show schematic side views of further embodiments of an inventive airbag cover with free spaces in the carrier layer and differently formed hinges with two hinge axes X, Y.
Figure 3B:
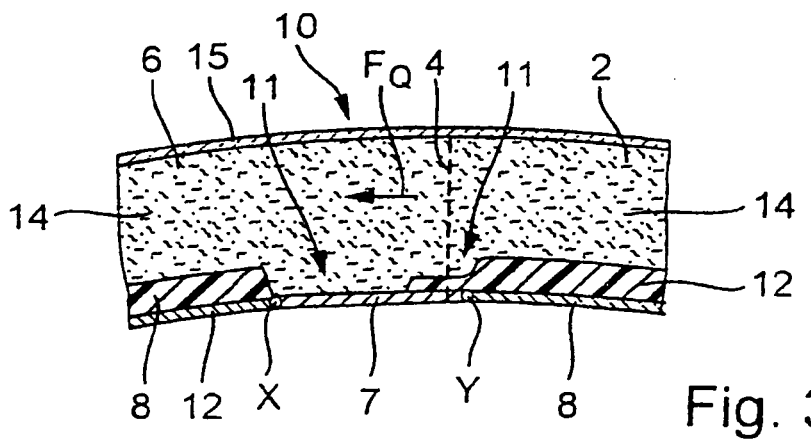
Figure 3C:
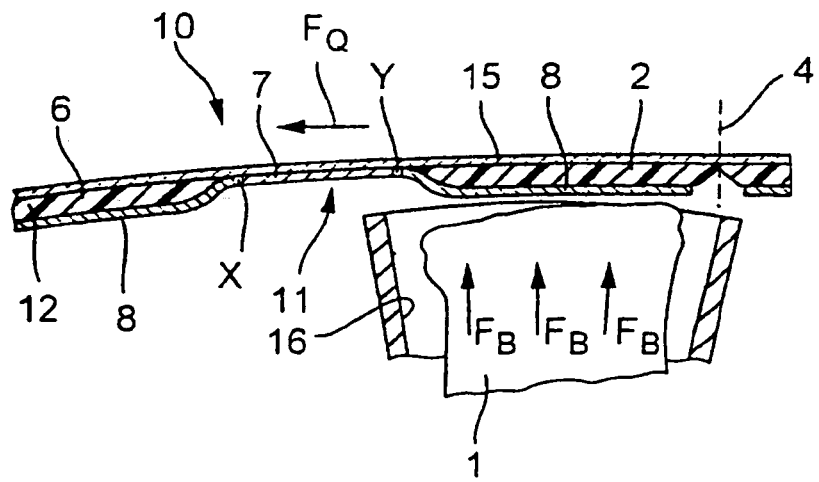

FIGS. 3a, 3b and 3c show side views and sections of further embodiments for shapes and assembly types of an inventive hinge 7. On the side of the fixed panelling part 6 (FIG. 3a), the hinge 7 is connected to a reinforcement plate 8 via the articulated axis X, wherein the sheet metal 8 is thereby above a carrier layer 12. The hinge 7 is also articulated to a reinforcement plate 8 on the side of the airbag flap 2 (articulated axis Y). The reinforcement plate 8 is thereby disposed below the carrier layer 12. This produces a type of material step which may influence the properties and the transverse forces $F_Q$ produced during opening. The carrier layer 12 extends on the lower side with respect to the articulated axis X, whereas a free space 11 is defined at the upper side in the region of the hinge 7. The hinge 7 itself may be realized as a retaining strap hinge, as a sheet metal bridge with predetermined bending points at the articulated axes X, Y, or in any other conventional fashion. The surface of the foam layer 14 facing the passenger compartment is provided with a decorative layer or lining 15 which also completely covers the predetermined tearing region 4. The carrier layer 12 is formed from a material which is more rigid and solid than foam 14 but is lighter than the material of the reinforcement plate 8. Plastic materials may preferably be used for the carrier layer 12, the foam 14 and the lining 15, whereas the reinforcement plate 8 and the hinge 7 are preferably formed from sheet metal, such as e.g. an aluminium sheet. The hinge 7 may also be produced from plastic materials or a composite material. The hinge 7 can be connected and mounted to the panelling part 6 and the flap 2 in any other fashion as shown, e.g. by welding or screwing.

FIG. 3b shows a schematic, sectional side view of a further embodiment. In this embodiment, the hinge 7 is connected to one reinforcement plate 8 on the panelling part 6 and one on the flap 2, which is located below a carrier layer 12. Free spaces 11 are thereby defined in the region of the hinge 7 to specifically influence the strength and direction of the forces acting during tearing off. The carrier layer 12 ends abruptly on the side of the hinge axis X and the carrier layer 12 is gradually reduced on the side of the flap 2. The hinge 7 can therefore move more freely on the hinge axis X than on the hinge axis Y. This facilitates the pivoting process when the flap 2 is initially torn open (pivoting mainly about axis X). The flap 2 subsequently folds over to completely open the airbag cover 10 (pivoting about axis Y), thereby dampening the pivoting motion through the partially still present carrier layer 12, in order to prevent excessive acceleration and thereby damage to bordering parts within the vehicle.

FIG. 3c also shows a schematic partial side view of a further embodiment of an inventive airbag cover in the region of the hinge 7. In contrast to the previous embodiments, no foam layer 14 is provided, such that the carrier layer 12 is directly covered by a lining 15. A continuous free space is defined in the region of the hinge 7, such that the hinge 7 is directly supported on the lining or decorative layer 15. The hinge 7 has the shape of a reversely drawn or depression-like region which spans the free space 11 of the carrier layer 12. Hinge axes X, Y are formed at the bending points of this design, such that the operating force $F_B$ of the airbag 1 initially slightly lifts the flap 2 in an outward direction (on the side of the hinge), wherein, due to the two hinge axes X, Y, the lever arms of the hinge 2 directly generate a transverse force $F_Q$, which supports and accelerates tearing off of the flap 2 at the predetermined breaking point 4. The flap is turned into the actual pivot direction C about the pivot axis Y only when it has been completely torn off, wherein the remaining opening energy is considerably reduced due to the forces used for tearing off. Uncontrolled hurling away and great acceleration of the airbag cover 10 is thereby effectively prevented. In this embodiment as well, the shape of the hinge, the shape and size of the free space 11, and the design of the hinge axes X, Y can be selected to correspondingly control the forces generated during opening. The hinge 7 may also be designed as a retaining strap, a flexible element, or a rigid pivot hinge with two articulated points, and have any suitable shape, as long as a force component transverse to the actual opening direction is generated during initial opening of the not yet completely torn off airbag flap 2 by the lever arms of the double-articulated pivot hinge or hinge region 7.

All the features and elements shown in the description, the following claims and in the drawings may be essential to the invention either individually or in arbitrary combination.

We claim:

1. An airbag cover for an airbag, the airbag disposed within a receiving space of an interior panelling of a vehicle, the airbag cover connected to a panelling part of the interior panelling, the cover comprising:
   a flap, said flap closed predetermined breaking regions or points and structured to open when the airbag is triggered;
   a carrier layer cooperating with said flap and with the panelling part; and
   a connecting element disposed between and connecting said flap to the panelling part, said connecting element having at least one hinge with at least two hinge axes structured to divert part of operating forces of the airbag, which act in an opening direction, into a force transverse to said opening direction at a start of an opening phase of the airbag, wherein said carrier layer has a free space proximate to said hinge, said free space being disposed, structured and dimensioned to define a strength of transverse forces exercised on said flap in response to triggering or the airbag, wherein said carrier layer is disposed alternately on different sides relative to a reinforcement plate disposed on the panelling part and relative to a reinforcement plate disposed on the flap for controlling a strength of transverse forces acting in an opening phase to tear at said predetermined breaking regions.

2. The airbag cover of claim 1, wherein said hinge is formed from a flexible material resistant to tensile forces, said flexible material thereby disposed between a rigid portion of the panelling part and the flap to constitute said hinge and to define said at least two hinge axes.

3. The airbag cover of claim 1, wherein said hinge is directly connected to a panelling part reinforcement plate and to a flap reinforcement plate.

4. The airbag cover of claim 3, wherein said hinge is formed in one piece with said reinforcement plates, wherein said hinge axes are defined by predetermined bending points in sheet metal.

5. The airbag of claim 1, wherein said hinge is structured as a retaining strap, made from metal or plastic.

6. The airbag cover of claim 1, wherein said hinge comprises a metal or plastic weave.

7. The airbag cover of claim 1, wherein a separation between parallel axes of said hinge axes is adjusted to a thickness of the panelling part such that the flap pivots completely open and does not block release of the airbag.

8. The airbag cover of claim 1, wherein a width of said hinge is adjusted to define a resistance and energy acceptance and thereby a force development during release of the airbag.

9. The airbag cover of claim 1, wherein said hinge has at least one opening which controls transverse forces acting on said flap in an opening phase of the airbag cover.

10. An airbag cover for an airbag, the airbag disposed within a receiving space of an interior panelling of a vehicle, the airbag cover connected to a panelling part of the interior panelling, the cover comprising:
- a flap, said flap closed via predetermined breaking regions or points and structured to open when the airbag is triggered;
- a carrier layer cooperating with said flap and with the panelling part; and
- a connecting element disposed between and connecting said flap to the panelling part, said connecting element having at least one hinge with at least two hinge axes structured to divert part of operating forces of the airbag, which act in an opening direction, into a force transverse to said opening direction at a start of an opening phase of the airbag, wherein said carrier layer has a free space proximate to said hinge, said free space being disposed, structured and dimensioned to define a strength of transverse forces exercised on said flap in response to triggering of the airbag, wherein said flap and the panelling part each have a carrier layer, said hinge being mounted to the panelling part and to said flap on opposing sides of the carrier layers.

11. The airbag cover of claim 10, wherein said hinge is formed from a flexible material resistant to tensile forces, said flexible material thereby disposed between a rigid portion of the panelling part and the flap to constitute said hinge and to define said at least two hinge ages.

12. The airbag cover of claim 10, wherein said hinge is directly connected to a panelling part reinforcement plate and to a flap reinforcement plate.

13. The airbag cover of claim 12, wherein said hinge is formed in one piece with said reinforcement plates, wherein said hinge axes are defined by predetermined bending points in sheet metal.

14. The airbag of claim 10, wherein said hinge is structured as a retaining strap, made from metal or plastic.

15. The airbag cover of claim 10, wherein said hinge comprises a metal or plastic weave.

16. The airbag cover of claim 10, wherein a separation between parallel axes of said hinge axes is adjusted to a thickness of the panelling part such that the flap pivots completely open and does not block release of the airbag.

17. The airbag cover of claim 10, wherein a width of said hinge is adjusted to define a resistance and energy acceptance and thereby a force development during release of the airbag.

18. The airbag cover of claim 10, wherein said hinge has at least one opening which controls transverse forces acting on said flap in an opening phase of the airbag cover.

* * * * *